United States Patent
Schirdewahn et al.

(10) Patent No.: US 11,095,659 B2
(45) Date of Patent: Aug. 17, 2021

(54) PERSONALIZED SERVICES BASED ON CONFIRMED PROXIMITY OF USER

(71) Applicant: Cisco Technology, Inc., San Jose, CA (US)

(72) Inventors: Jochen C. Schirdewahn, Stabekk (NO); Colin I. Quirke, County Galway (IE); John J. Costello, County Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 341 days.

(21) Appl. No.: 15/992,379

(22) Filed: May 30, 2018

(65) Prior Publication Data

US 2019/0372988 A1 Dec. 5, 2019

(51) Int. Cl.
*G06F 13/40* (2006.01)
*G06F 21/30* (2013.01)
*H04L 29/06* (2006.01)
*H04L 9/08* (2006.01)

(52) U.S. Cl.
CPC ........ *H04L 63/107* (2013.01); *G06F 13/4027* (2013.01); *G06F 21/30* (2013.01); *H04L 63/0853* (2013.01); *H04L 9/0872* (2013.01)

(58) Field of Classification Search
CPC .............. H04L 9/0872; H04L 63/0884; H04L 63/0853; H04L 63/107; G06F 21/30; G06F 21/34; G06F 13/4027
See application file for complete search history.

(56) References Cited

U.S. PATENT DOCUMENTS

| | | |
|---|---|---|
| 7,466,812 B1 * | 12/2008 | Mahy ...................... H04M 3/56 370/260 |
| 9,241,016 B2 | 1/2016 | Barth et al. |
| 9,338,394 B2 | 5/2016 | Li et al. |

(Continued)

OTHER PUBLICATIONS

Thomas Fox-Brewster, "Meet the "Ultrasonic" Tracking Company Privacy Activists Are Terrified of", Nov. 16, 2015, https://www.forbes.com/sites/thomasbrewster/2015/11/16/silverpush-ultrasonic-tracking/#674ef5b644a2, 5 pages.

(Continued)

*Primary Examiner* — Daniel B Potratz
(74) *Attorney, Agent, or Firm* — Edell, Shapiro & Finnan, LLC

(57) ABSTRACT

A first computing device that provides a first service is configured to securely provide personalized services to a user of a second computing device. The first computing device obtains an authentication token and confirms the proximity of the user associated with the second computing device. The first computing device confirms the proximity of the user by detecting a connection of a physical cable between the first computing device and the second computing device. The first computing device provides the authentication token to the second computing device via the physical cable. The first computing device also authenticates the user of the second computing device and determines a second service available to the user of the second computing device. The first computing device combines the first service with the second service to provide a personalized service to the user at the first computing device.

20 Claims, 6 Drawing Sheets

(56) References Cited

U.S. PATENT DOCUMENTS

| | | | |
|---|---|---|---|
| 9,473,580 B2 | 10/2016 | Barth et al. | |
| 2008/0120712 A1* | 5/2008 | Ayers | G06F 21/35 |
| | | | 726/9 |
| 2012/0092441 A1 | 4/2012 | Kong et al. | |
| 2013/0288601 A1* | 10/2013 | Chhabra | H04W 8/18 |
| | | | 455/41.2 |
| 2014/0189841 A1* | 7/2014 | Metke | G06F 21/40 |
| | | | 726/9 |
| 2014/0208384 A1* | 7/2014 | Youssefian | H04L 63/0869 |
| | | | 726/3 |
| 2016/0119314 A1* | 4/2016 | Uzelac | H04L 63/0807 |
| | | | 726/6 |

OTHER PUBLICATIONS

"StreamNet™ Digital Media and System Design Reference Guide", ClearOne, 803-001-103 Rev 2.1, 2011, 84 pages.

Alexander Freysson, et al., "Video Conferencing—User Interface with a Remote Control for TV-sets", Master's Thesis, Department of Design Sciences, Lund University, EAT 2015, 84 pages.

Administrator Guide, "Polycom® RealPresence® Group Series", Polycom, 4.2.0, Jan. 2015, 3725-69988-004/A, pp. 1-110.

Administrator Guide, "Polycom® RealPresence® Group Series", Polycom, 4.2.0, Jan. 2015, 3725-69988-004/A, pp. 111-221.

Apple Inc., "Thunderbolt 3.", https://www.apple.com/thunderbolt/, downloaded Jun. 25, 2020, 13 pages.

Wpincyma, "Introduction to CEC", https://kwikwai.com/knowledge-base/introduction-to-cec/, Jun. 4, 2018, 3 pages.

* cited by examiner

PERSONALIZED SERVICES BASED ON CONFIRMED PROXIMITY OF USER

TECHNICAL FIELD

The present disclosure relates to securely providing personalized services to users of public-use devices.

BACKGROUND

In traditional meeting rooms, users may connect their portable, personal computing devices (e.g., laptop computers, tablet computers, smart phones, etc.) with general-use conferencing devices with greater capabilities. For instance, the conferencing devices may provide services such as video systems, digital whiteboards, improved audio speakers and microphones, and/or digital projectors. Additionally, the conferencing devices may provide a faster network connection, and/or improved computing hardware (e.g., processors, memory, etc.) than the personal devices provide.

During each conferencing session, the user connects his personal device to the conferencing device in order to use the services provided by the conferencing device. In one example, the personal device runs an application that pairs with the conferencing device. The public-use conferencing device may broadcast a wireless pairing signal (e.g., ultrasound or Bluetooth®), which enables the personal device to pair with the conferencing device.

DESCRIPTION OF EXAMPLE EMBODIMENTS

Overview

Figure 1:
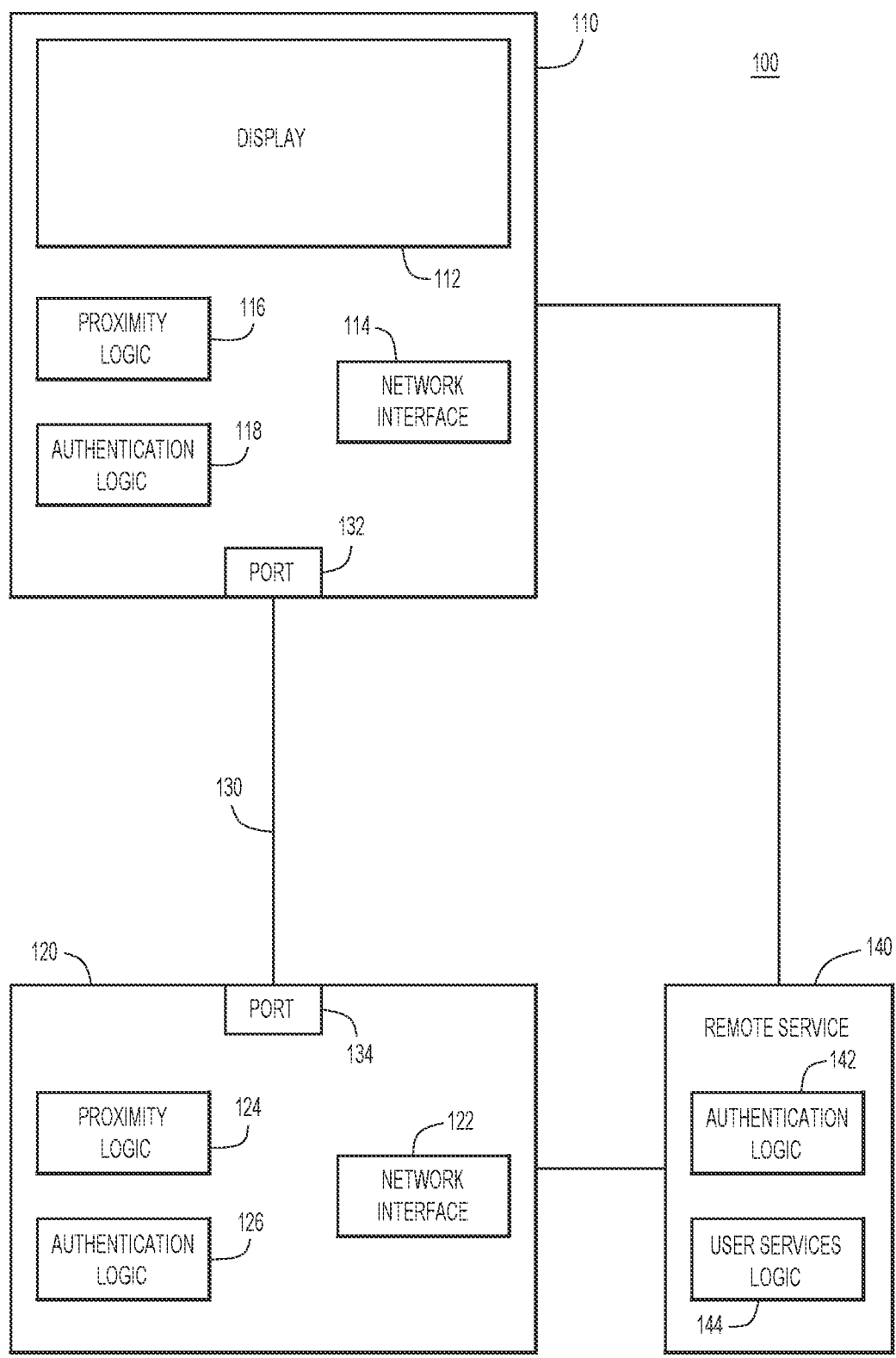
FIG. 1 is a simplified block diagram of a system connecting a user device to a general-use conferencing device to combine the services available at each device, according to an example embodiment.

In one embodiment, a computer-implemented method is provided for a first computing device that provides at least one first service to securely provide personalized services to a user. The method includes obtaining an authentication token and confirming the proximity of the user associated with a second computing device. The first computing device confirms the proximity of the user by detecting a connection of a physical cable between the first computing device and the second computing device. The method further comprises providing the authentication token to the second computing device via the physical cable. The method also includes authenticating the user of the second computing device and determining at least one second service available to the user of the second computing device. The method further comprises combining the at least one first service with the at least one second service to provide at least one personalized service to the user at the first computing device.

DETAILED DESCRIPTION

Typically, a conferencing application on the personal device (e.g., a laptop computer) would receive ultrasound signals from the conferencing device (e.g., a video system) to establish a relationship that allows the application to control the services on the conferencing device with personalized services (e.g., message notification, calendar, etc.). As there is typically only a single video conferencing/collaboration device installed in a meeting room, it is simple to transmit an ultrasound token from the conferencing device. The token may be received by the application on the personal device and used as proof of physical presence of the user in the meeting room to be authorized for additional service. Such additional services may include controlling the video conferencing/collaboration device (e.g., to make/disconnect calls, mute/unmute audio, control camera operations, etc.), accessing a personal phonebook and/or calendar, accessing personal files or other data, showing personal message notifications, viewing/recording a presentation being shared, sharing a presentation so that it is shown on the local video conferencing device and potentially shared in a call/conference, and participating in a whiteboarding session or other annotation/collaboration activity.

However, traditional meeting rooms with a single set of conferencing hardware are being replaced by flexible arrangements including open and semi-open spaces. Conferencing devices may be used in a flexible way as shared systems for teams or as personal devices for a specific user. In a crowded environment with multiple conferencing devices and/or personal devices, ultrasound pairing may require additional steps to ensure that the correct personal device is paired with the appropriate conferencing device. The techniques presented herein allow a shared conference device to run and display personalized services by simply and securely pairing with a user's personal device without being required to catch an ultrasound signal, with no additional buttons to press, and while maintaining a secure environment.

Additionally, users of a conferencing system may access services differently depending on how their personal device connects to the conferencing device. For instance, personal devices may physically connect to general-use conferencing devices with a physical cable (e.g., a High Definition Multimedia Interface (HDMI) cable or Universal Serial Bus (USB) cable). Alternatively, the personal devices may be virtually connected to the conferencing devices via a network. Further, the virtual connection may be a direct peer-to-peer connection, or the virtual connection may be mediated by a network service.

Each type of connection includes advantages and a user may not realize the different choices in connection, and how that choice impacts the services available to the user. For instance, a physical cable connection allows reliability, high bandwidth, and low latency for media presentations. In contrast, a virtual connection may provide an advantage in integration with network service tools to facilitate booking recording, tracking, updating, inviting participants, and retrieving work products. A virtual connection is particularly useful for services that require the user's identity. The techniques presented herein allow a user to connect a personal device to a conferencing device via a physical cable to secure the advantages and simplicity of a physical connection, while using that physical connection to obtain the advantages of a virtual connection.

Referring now to FIG. 1, a conferencing system 100 is shown that is configured to securely pair a personal device with a general-use conferencing device to combine the service available to each device. The system 100 includes a conferencing device 110 comprising a display 112, a network interface 114, proximity logic 116, and authentication logic 118. The system 100 also includes a personal device 120 comprising a network interface 122, proximity logic 124, and authentication logic 126. A physical cable 130 connects a physical port 132 in the conferencing device 110 with a port 134 in the personal device 120. The system 100 may also include a remote service 140 comprising authentication logic 142 and user services logic 144.

In one example, the conferencing device 110 may include additional elements, such as digital whiteboards, projectors, and/or microphone/speaker arrays, each of which may provide a service to users of the conferencing device 110. In other words, the conferencing device 110 may provide a variety of services to any user, for as long as the user is authorized to use the conferencing device 110. In some instances, the services offered by the conferencing device 110 may overlap with the services offered by the personal device 120, such as both devices offering a network connection. Typically, the hardware supporting the services offered by the conferencing server 110 is better than the hardware supporting the services offered by the personal device 120. For instance, the conferencing server 110 may offer a larger display for presentation, a faster network connection, or higher quality audio components.

In another example, the remote service 140 may be a cloud provided service that is accessed over the network interfaces 114 and 122 of the conferencing device 110 and the personal device 120, respectively. Alternatively, the remote service 140 may be provided on the premises of the meeting room in connection with the conferencing device 110. On-premise installations allow the physical connection of the cable 130 to resolve routability issues that may arise between a wireless network and the conferencing device 110.

To facilitate the authentication and association process, the conferencing device 110 may offer standard networking capabilities to the personal device 120 over the cable 130. In this case, an application on the personal device 120 may run the association protocol using standard networking libraries.

In a further example, the cable 130 may be prewired or already connected to the conferencing device 110, such that when a user wants to use the services provided by the conferencing device 110, the user merely plugs the cable 130 into the port 134 of the personal device 120 to initiate the pairing process. The user experience is as simple as the user plugging in an external monitor, but a communication protocol over the cable 130 authenticates the personal device 120 and enables services personalized to the user.

In some examples, the cable 130 may be an HDMI cable, a USB-C cable, a DisplayPort cable, or a Thunderbolt cable. If the cable 130 is an HDMI cable, the personal device 120 and the conferencing device 110 may communicate over the HDMI Display Data Channel (DDC) or Consumer Electronics Control (CEC) channel. The CEC channel is defined to provide high-level control (e.g., recording remote control event forwarding, etc.) of audiovisual products, but does not have a generic authentication protocol defined. If the cable 130 is a DisplayPort cable, the Auxiliary (AUX) channel may be used for authentication. Availability of these channels to a user space application may vary depending on the hardware of the personal device 120. The Thunderbolt and USB-C standards may carry a raw video stream (e.g., extended desktop or desktop mirror) alongside a generic data communication on the same cable. For USB-C, the data communication is typically implemented as a standard USB link.

In another example, using the physical HDMI connection to establish a network-based virtual connection between the personal device 120 and the conferencing device 110 optimizes the user experience with a superset of the capabilities provided with a physical connection and a virtual connection. The HDMI specification includes a CEC channel that enables two-way communication for CEC-enabled devices connected with HDMI. The CEC specification includes a common command set to allow different vendors to cooperate in sending remote control signals between devices to support end-user features (e.g., one-touch play or system standby), as well as vendor-specific commands (e.g., a vendor command with user identity).

Each device connected to a CEC bus is assigned a 4-bit logical address (i.e., 0-15). The first byte of a CEC command is typically reserved for the logical address of the sender and receiver. The second byte of the CEC is the CEC message type (e.g., 89 for a vendor command or AO for a vendor command with identity).

In one example, when the conferencing device 110 is connected to an HDMI-CEC bus (e.g., over the cable 130), the conferencing device 110 may broadcast a vendor identifier over the CEC channel to all of the connected devices (e.g., personal device 120). Additionally, the conferencing device 110 may broadcast the vendor identifier when a new device (e.g., personal device 120) is added to the HDMI-CEC bus. An application (e.g., a software agent) on the personal device 120 may listen to the CEC commands on the HDMI port. If the application detects a known vendor identifier, then the personal device 120 may use vendor-specific commands to request a virtual connection with the conferencing device 110. No additional user interaction would be necessary to install the virtual connection beyond plugging in the HDMI cable 130.

In this example, a user would not have to decide between the advantages of a physical connection or a virtual connection. With no explicit user interaction, the virtual connection may be established and a user's identity verified. All of the benefits provided by the added virtual connection would automatically be available to the user based on the physical connection of the cable 130. The simplicity of maintaining the virtual connection based on the physical connection greatly enhances the user experience with the conferencing system 100.

Figure 2:
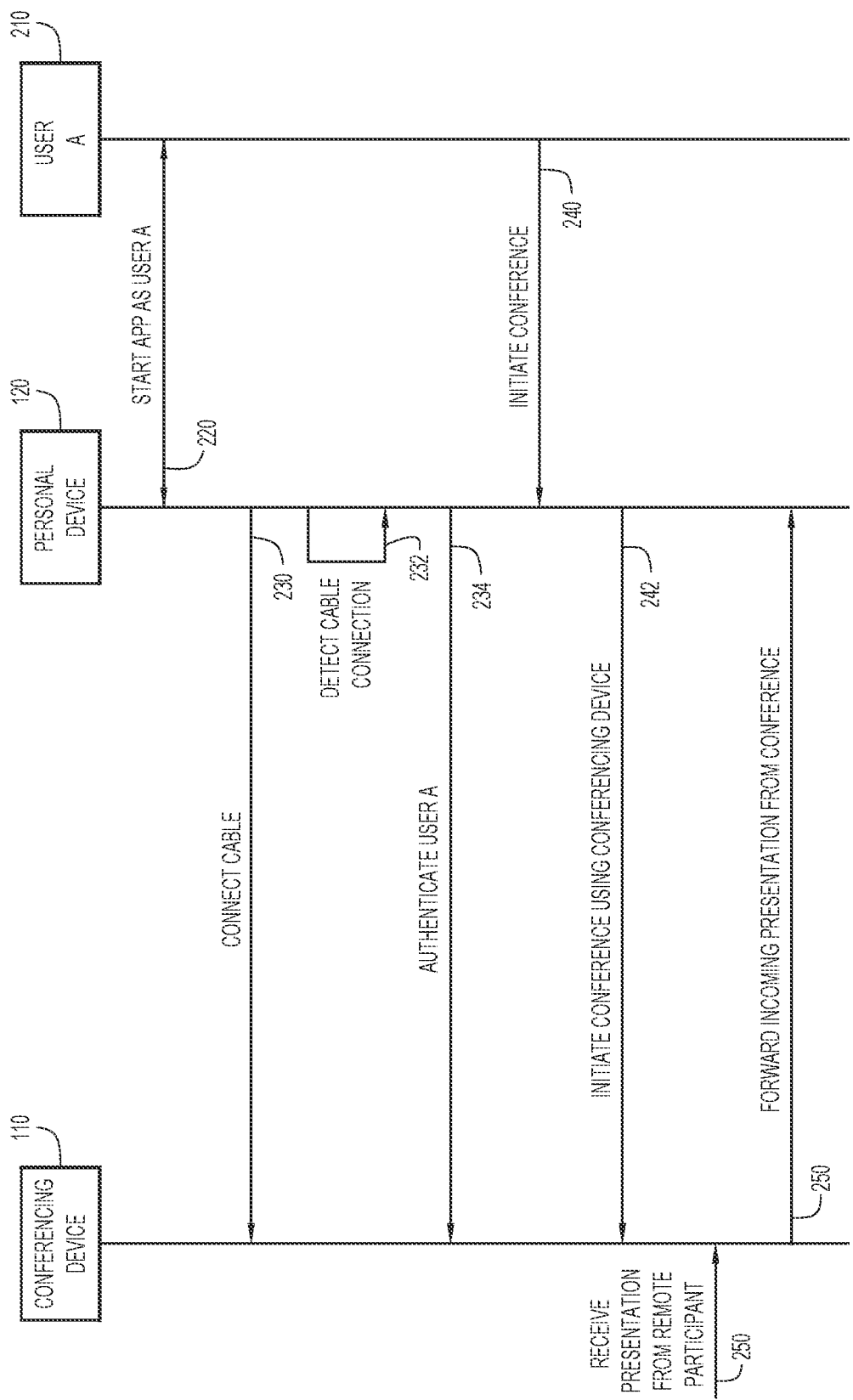
FIG. 2 is a message flow diagram illustrating a user device connecting authenticating directly to the conferencing device, according to an example embodiment.

Referring now to FIG. 2, a message flow diagram illustrates an example of a pairing process directly between the personal device 120 and the conferencing device 110. Initially, a user 210 starts an application on the personal device 120 and logs in as User A though an exchange 220. The exchange 220 may include one or more steps to authenticate the identity of User A to the personal device 120. At 230, the physical cable is connected between the personal device 120 and the conferencing device 110. The personal device 120 detects the connection to the conferencing device 110 at 232. The personal device 120 sends an authenticated user identity 234 (e.g., User A) of the user 210 to the conferencing device 110. In one example, the authenticated user identity 234 may include a token that the conferencing device processes to establish the authentic user identity of the user 210. In another example, the conferencing device 110 may have a set of pre-authorized user identities that are permitted to use the conferencing device 110, with specified permissions for each user identity.

At 240, the user 210 instructs the personal device 120 to initiate a conference. The user 210 may specify parameters of the conference (e.g., invitees, collaboration tools, presentations to share, etc.) to the personal device 120 as part of initiating the conference. The personal device 120 sends a message 242 to the conferencing device 110 to initiate the conference through the conferencing device 110. In other words, the user 210 is able to control the service available at the conferencing device 110 through the personal device 120, once the personal device has provided an authorized user identity to the conferencing device 110. As part of the conference, the conferencing device 110 receives a presentation 250 from a remote participant in the conference and forwards the presentation 250 to the personal device 120. In one example, the personal device 120 may store the presentation 250 for later viewing.

Figure 3:
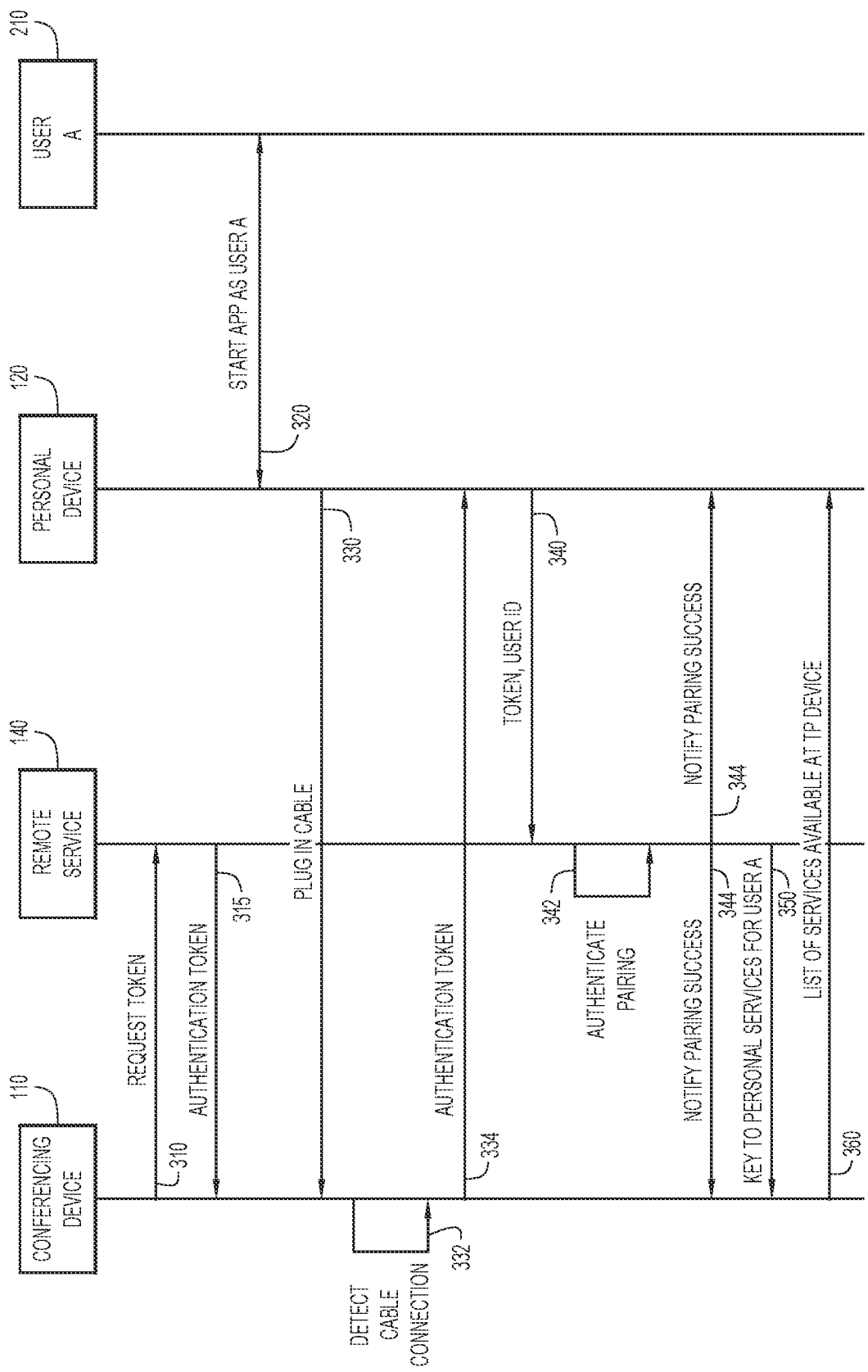
FIG. 3 is a message flow diagram illustrating a user device authenticating to a conferencing device via a remote service, according to an example embodiment.

Referring now to FIG. 3, a message flow diagram illustrates an example of pairing the personal device 120 with the conferencing device 110 though the remote service 140. Initially, the conferencing device 110 connects to the remote service 140 and sends a request 310 for a token. The remote service 140 responds with an authentication token 315. The token 315 may be a random number generated by the remote service 140 that is used to identify the remote service 140. For on-premise deployments of the remote service 140, the token may include the network address of the remote service 140 so that any devices that get the token from the conferencing device can subsequently connect directly to the remote service 140. However, this direct connection may be limited by network administrators who block wireless network connectivity between unknown devices (e.g., personal device 120 before authentication) and the remote service 140.

The user 210 starts an application on the personal device 120 and logs in as User A though an exchange 320. The exchange 320 may include one or more steps to authenticate the identity of User A to the personal device 120. At 330, the physical cable is connected between the personal device 120 and the conferencing device 110. The conferencing device 110 detects the cable connection at 332 and sends the authentication token 334 to the personal device 120. In one example, the conferencing device 110 sends the token 334 over an HDMI-CEC channel. The personal device sends a message 340 to the remote service 140 to complete the pairing of the personal device 120 with the conferencing device 110. The message 340 includes the authentication token received from the conferencing device 110 and the user identity (e.g., User A) of the user 210.

The remote service 140 receives the token and user identity and authenticates the pairing at 342 to allow the personal device 120 to use the services available at the conferencing device 110. The remote service 140 sends a notification 344 to both the conferencing device 110 and the personal device 120. The notification 344 informs the two devices that the pairing was successful and that the personal device 120 is now authorized to use the services of the conferencing device 110. After the successful pairing, the remote service 140 may sends a key 350 that unlocks personal services associated with the user identity of the user 210 to the conferencing device 110. Alternatively, the conferencing device 110 may route any request for personal services through the remote service 140 to prevent the publically available conferencing device from ever storing the user's identity or other user-sensitive information (e.g., passwords, cryptographic tokens, etc.). Additionally, the conferencing device 110 may send a list 360 of the services available at the conferencing device 110 to the personal device 120, enabling the user 210 to control the specific capabilities of the conferencing device 110 through the personal device 120.

In the example shown in FIG. 3, the remote service 140 provisions a token that the conferencing device 110 and the personal device 120 exchange over a physical cable to prove their proximity. As a result of the messages exchanged, the conferencing device 110 possesses a key to access services (e.g., a personal phonebook) on behalf of the user 210. Additionally, the personal device 120 is aware of the services that it can access in the conferencing device 110.

Figure 4:
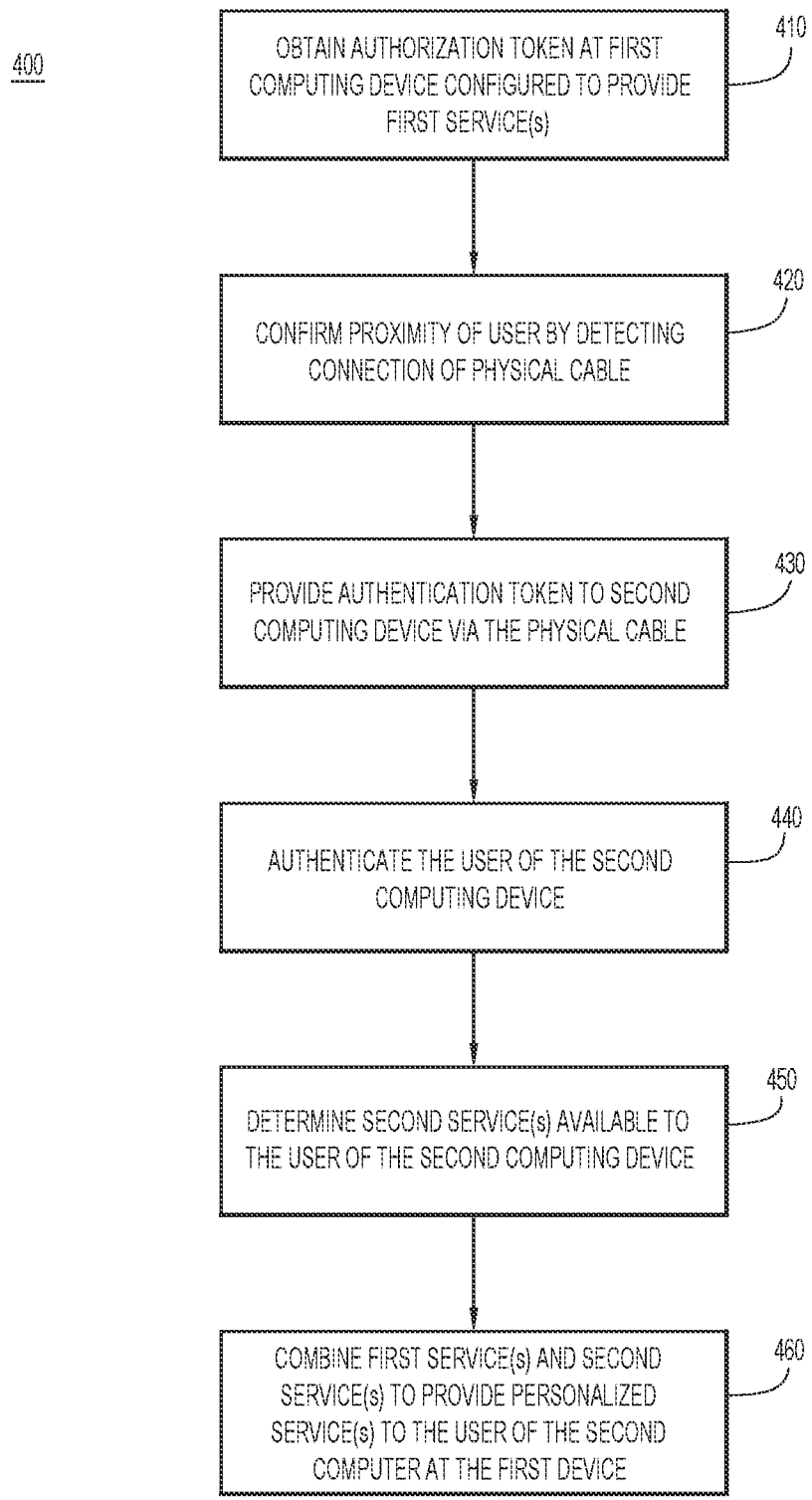
FIG. 4 is a flowchart depicting operations of a conferencing device in pairing with a user device to offer personalized services, according to an example embodiment.

Referring now to FIG. 4, a flowchart is shown for a process 400 by which a first computing device (e.g., conferencing device 110) personalizes at least one first service (e.g., video display, digital whiteboard, video conferencing, etc.) based on an authenticated user identity. At 410, the first computing device obtains an authentication token. In one example, the first computing device obtains the authentication token from a trusted remote service. Alternatively, the first computing device may generate the authentication token without external input. At 420, the conferencing device confirms the proximity of a user to the first computing device by detecting a connection of a physical cable between the first computing device and a second computing device associated with the user.

At 430, the first computing device provides the authentication token to the second computing device via the physical cable. In one example, the authentication token may include a random number or a network address of a trusted remote service. At 440, the first computing device authenticates the user associated with the second computing device. In one example, the first computing device may receive a user identity from the second computing device that may be verified with a trusted remote service. Alternatively, the first computing device may store pre-authorized user identities and compare the user identity provided by the second computing device to the pre-authorized user identities.

At 450, the first computing device determines at least one second service (e.g., personal phonebook, presentation materials, etc.) available to the user of the second computing device. At 460, the first computing device combines the at least one first service provided by the first computing device with the at least one second service available to the user of the second computing device to provide at least one personalized service to the user at the first device. In one example, the first computing device combines the first service of initiating an online conference with the second service of a personal phonebook to provide the personalized service of initiating an online conference and inviting participants using addresses stored in the personal phonebook. In another example, the first computing device combines the first service of sharing material in an online conference with the second service of personal presentation material to provide the personalized service of sharing the personal presentation material to the online conference through the first computing device.

Figure 5:
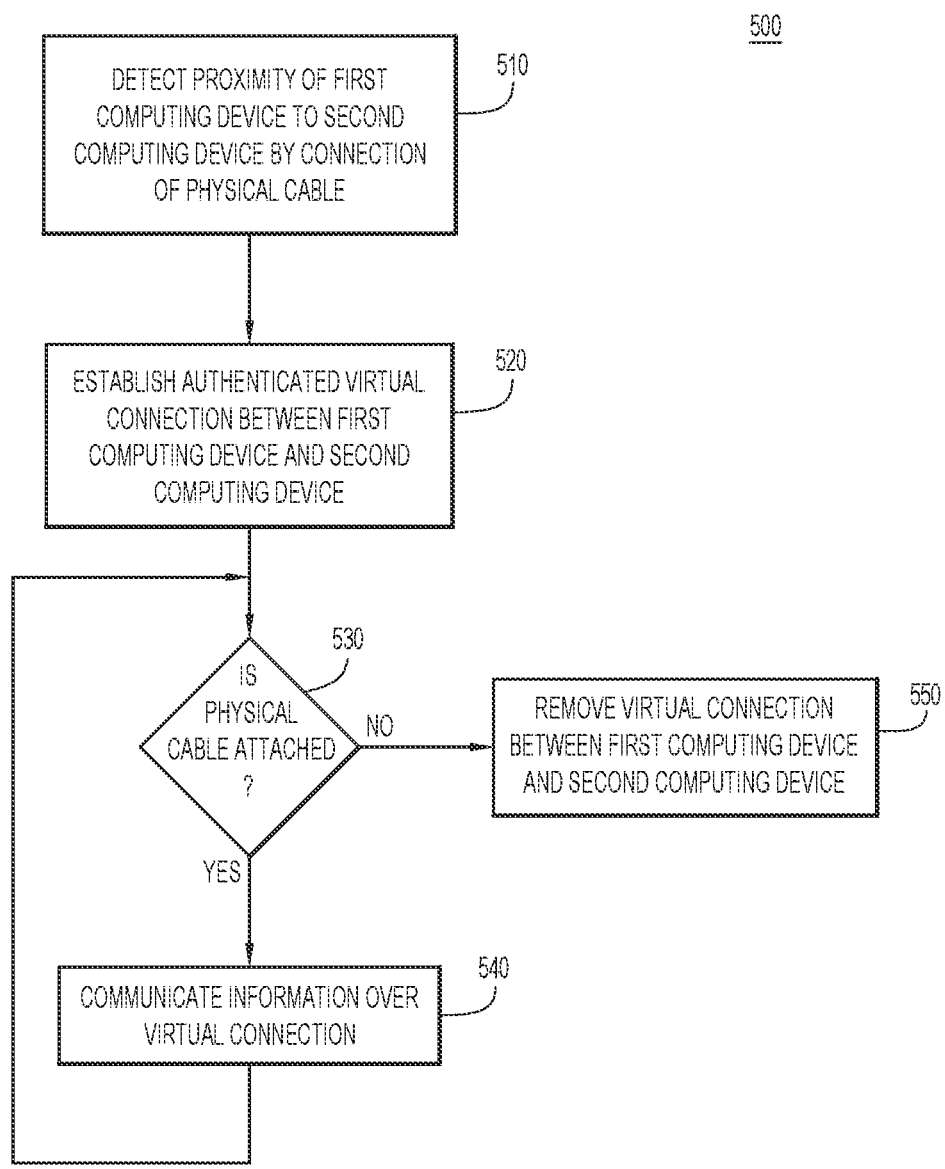
FIG. 5 is a flowchart depicting operations of a conferencing device in establishing a virtual connection with a user device based on a physical connection, according to an example embodiment.

Referring now to FIG. 5, a flowchart is shown for a process 500 by which a first computing device (e.g., conferencing device 110) tethers a virtual connection to a second computing device (e.g., personal device 120) to the physical connection between the devices. At 510, the first computing device detects the proximity of the second computing device by the connection of a physical cable between the first computing device and the second computing device. In one example, the second computing device may provide a user identity to the first computing device over the physical cable connection. At 520, the first computing device establishes an authenticated virtual connection between the first computing device and the second computing device. In one example, the virtual connection may be over a computer network (e.g., a wireless computer network) that connects the two computing devices. Alternatively, the virtual connection may be routed through a third computing device (e.g., a remote server) that is trusted by both the first computing device and the second computing device.

While the physical cable is attached to both the first computing device and the second computing device, as determined at 530, the first computing device and the second computing device may communicate information over the virtual connection at 540. In one example, the virtual connection may be used to communicate personal information associated with the second computing device to the first computing device. Additionally, the first computing device may communicate a list of services available at the first computing device to the second computing device.

If the physical cable is removed from either first computing device or the second computing device, severing the physical connection, the first computing device also removes the virtual connection between the first computing device and the second computing device at 550. In one example, the first computing device is configured to have access to personal information from the second computing device only as long as the second computing device is actively using the services of the first computing device. The first computing device uses the physical cable connection as verification that the second computing device is using the services of the first computing device, and interprets the severing of the physical connection as an indication that the second computing device is no longer using the services of the first computing device. The removal of the virtual connection removes any pathway for personal information from the second computing device to be accessed by the first computing device. This process provides a simple and intuitive user experience that securely combines the personalization advantages of virtual and physical connections and requires minimal user interaction.

Figure 6:
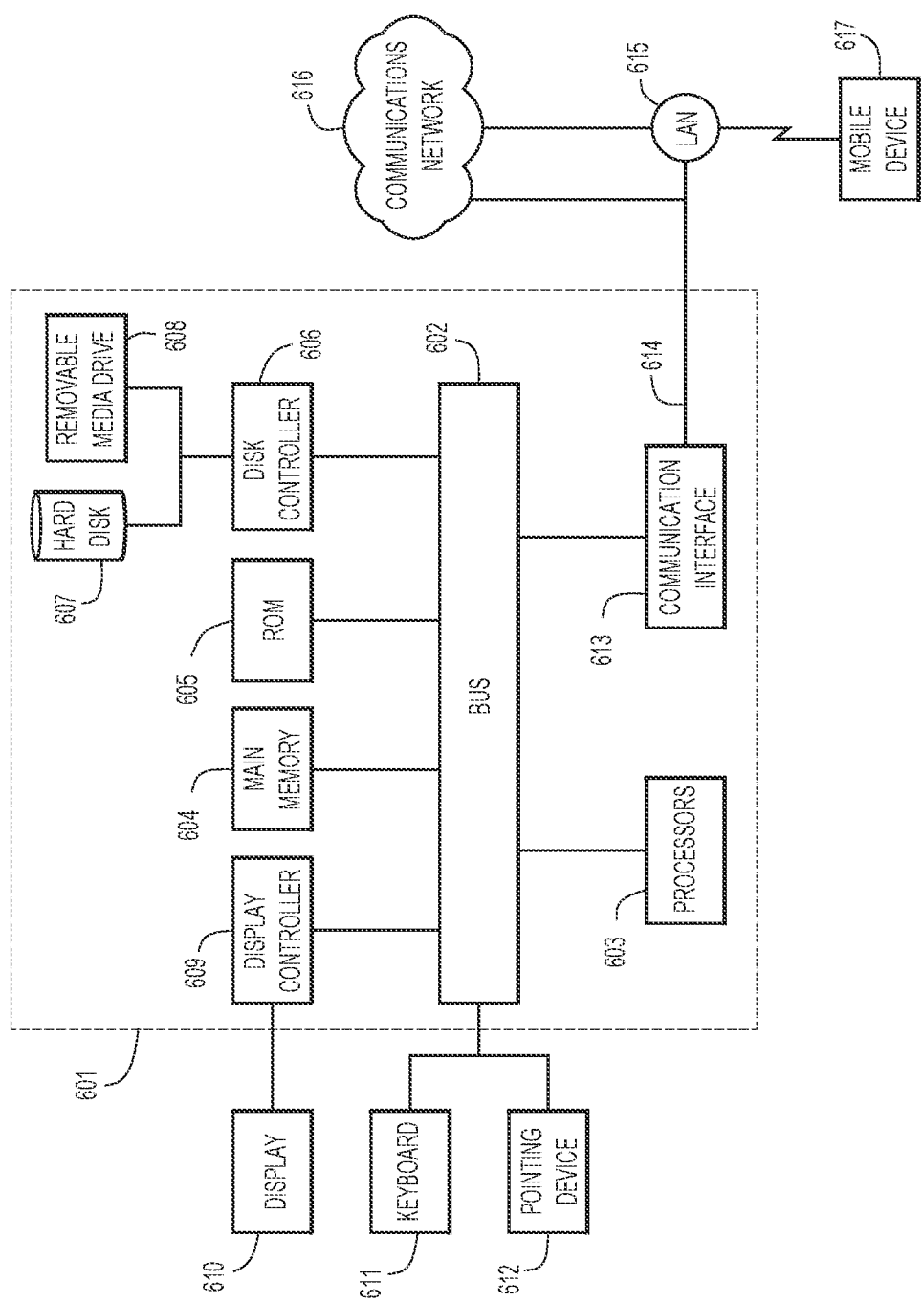
FIG. 6 is a simplified block diagram of a computing device that may be configured to perform methods presented herein, according to an example embodiment.

Referring now to FIG. 6, an example of a block diagram of a computer system 601 that may be representative of the conferencing device 110 or the personal device 120 in which the embodiments presented may be implemented is shown. The computer system 601 may be programmed to implement a computer based device. The computer system 601 includes a bus 602 or other communication mechanism for communicating information, and a processor 603 coupled with the bus 602 for processing the information. While the figure shows a single block 603 for a processor, it should be understood that the processors 603 may represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 701 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive, solid state drive, etc.). The storage devices may be added to the computer system 601 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 601 may also include a display controller 609 coupled to the bus 602 to control a display 610, such as a liquid crystal display (LCD) or light emitting diode (LED) display, for displaying information to a computer user. The computer system 601 includes input devices, such as a keyboard 611 and a pointing device 612, for interacting with a computer user and providing information to the processor 603. The pointing device 612, for example, may be a mouse, a trackball, track pad, touch screen, or a pointing stick for communicating direction information and command selections to the processor 603 and for controlling cursor movement on the display 610. In addition, a printer may provide printed listings of data stored and/or generated by the computer system 601. Further, the user may extend the bus 602 through a port to an external cable (e.g., presentation cable 130), which is used to communicate with another computing device.

The computer system 601 performs a portion or all of the processing steps of the operations presented herein in response to the processor 603 executing one or more sequences of one or more instructions contained in a memory, such as the main memory 604. Such instructions may be read into the main memory 604 from another computer readable storage medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the operations presented herein, and for enabling the computer system 601 to interact with a human user (e.g., a conference user). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA), tablet computer, laptop computer, or cellular telephone.

In summary, the techniques presented herein provide for the use of a presentation cable to authenticate a user for the purpose of controlling and accessing personalized services. The presentation cable is likely to be used to take advantage of the improved capabilities of a general-use conferencing device, and provides a simple, secure, and robust method of associating and authenticating a user identity with the conferencing device. Aside from plugging in the presentation cable, no further user interaction is needed to combine the personal information of the user with the services provided by the conferencing device. The physical presentation cable also confirms the physical presence of the user to the conferencing device.

In one form, a method is provided for a first computing device that provides at least one first service to securely provide personalized services to a user. The method includes obtaining an authentication token and confirming the proximity of the user associated with a second computing device. The first computing device confirms the proximity of the user by detecting a connection of a physical cable between the first computing device and the second computing device. The method further comprises providing the authentication token to the second computing device via the physical cable. The method also includes authenticating the user of the second computing device and determining at least one second service available to the user of the second computing device. The method further comprises combining the at least one first service with the at least one second service to provide at least one personalized service to the user at the first computing device.

In another form, an apparatus is provided comprising a network interface, at least one physical port, and a processor. The network interface is configured to communicate with computing devices over a computer network. The physical port is configured to connect to a physical cable. The processor is coupled to the network interface and physical port, and is configured to provide at least one first service to users of the apparatus and obtain an authentication token. The processor is also configured to confirm a proximity of a user associated with a computing device by detecting a connection of the physical cable between the physical port and the computing device. The processor is further configured to provide the authentication token to the computing device via the physical cable. The processor is also configured to authenticate the user of the computing device and determine at least one second service available to the user of the computing device. The processor is further configured to combine the at least one first service with the at least one second service to provide at least one personalized service to the user.

In yet another form, one or more non-transitory computer readable storage media is encoded with software comprising computer executable instructions and, when the software is executed by a processor on a first computing device, operable to cause the processor to provide at least one first service to users of the first computing device and obtain an authentication token. The software is operable to cause the processor to confirm the proximity of a user associated with a second computing device by detecting a connection of a physical cable between the first computing device and the second computing device. The software is also operable to cause the processor to provide the authentication token to the second computing device via the physical cable. The software is further operable to cause the processor to authenticate the user of the second computing device and determine at least one second service available to the user of the second computing device. The software is also operable to cause the processor to combine the at least one first service with the at least one second service to provide at least one personalized service to the user at the first computing device.

The above description is intended by way of example only. Although the present disclosure has been described in detail with reference to particular arrangements and configurations, these example configurations and arrangements may be changed significantly without departing from the scope of the present disclosure.

What is claimed is:

1. A method comprising:
   at a shared conferencing device configured to provide at least one first conferencing service, obtaining an authentication token;
   confirming a proximity of a user by detecting a connection of a physical cable between the shared conferencing device and a personal device associated with the user, the physical cable directly connecting a first port on the shared conferencing device and a second port on the personal device;
   providing the authentication token from the shared conferencing device to the personal device via the physical cable;
   authenticating the user of the personal device;
   determining at least one second service available to the user of the personal device; and
   combining the at least one first conferencing service with the at least one second service to provide at least one personalized service to the user at the shared conferencing device.

2. The method of claim 1, further comprising providing a list of personalized services including the at least one personalized service to the personal device.

3. The method of claim 1, further comprising terminating the at least one personalized service in response to detecting a disconnection of the physical cable.

4. The method of claim 1, wherein authenticating the user of the personal device comprises receiving a notification from a remote service of a pairing between the shared conferencing device and the personal device.

5. The method of claim 1, further comprising initiating a virtual connection between the shared conferencing device and the personal device.

6. The method of claim 5, wherein the virtual connection communicates information via a trusted remote service.

7. The method of claim 5, further comprising disconnecting the virtual connection upon a determination that the physical cable is disconnected from either the first port on the shared conferencing device or the second port on the personal device.

8. An apparatus comprising:
   a network interface configured to communicate with computing devices over a computer network;
   at least one physical port configured to connect to a physical cable; and
   a processor coupled to the network interface and the physical port, the processor configured to:
      obtain an authentication token;
      provide at least one first conferencing service to users of the apparatus;
      confirm a proximity of a specific user associated with a personal device by detecting a connection of the physical cable directly between the physical port on the apparatus and a corresponding physical port on the personal device;
      provide the authentication token from the apparatus to the personal device via the physical cable;
      authenticate the specific user of the personal device;
      determine at least one second service available to the user of the personal device; and
      combine the at least one first conferencing service with the at least one second service to provide at least one personalized service to the specific user.

9. The apparatus of claim 8, wherein the processor is further configured to provide a list of personalized services including the at least one personalized service to the personal device.

10. The apparatus of claim 8, wherein the processor is further configured to terminate the at least one personalized service in response to detecting a disconnection of the physical cable.

11. The apparatus of claim 8, wherein the processor is configured to authenticate the specific user of the personal device by receiving from a remote service via the network interface, a notification of a pairing between the apparatus and the personal device.

12. The apparatus of claim 8, wherein the processor is further configured to initiate a virtual connection between the network interface and the personal device.

13. The apparatus of claim 12, wherein the network interface is further configured to communicate information over the virtual connection via a trusted remote service.

14. The apparatus of claim 12, wherein the processor is further configured to disconnect the virtual connection upon a determination that the physical cable is disconnected from either the physical port on the apparatus or the corresponding physical port the personal device.

15. One or more non-transitory computer readable storage media encoded with software comprising computer executable instructions and, when the software is executed by a processor on a shared conferencing device, operable to cause the processor to:
   obtain an authentication token;
   provide at least one first conferencing service to users of the shared conferencing device;
   confirm a proximity of a user associated with a personal device by detecting a connection of a physical cable between the shared conferencing device and the personal device, the physical cable directly connecting a first port on the first computing shared conferencing device and a second port on the personal device;
   provide the authentication token to the personal device via the physical cable;
   authenticate the user of the personal device;
   determine at least one second service available to the user of the personal device; and
   combine the at least one first conferencing service with the at least one second service to provide at least one personalized service to the user at the shared conferencing device.

16. The non-transitory computer readable storage media of claim 15, further comprising instructions operable to cause the processor to provide a list of personalized services including the at least one personalized service to the personal device.

17. The non-transitory computer readable storage media of claim 15, further comprising instructions operable to cause the processor to terminate the at least one personalized service in response to detecting a disconnection of the physical cable.

18. The non-transitory computer readable storage media of claim 15, further comprising instructions operable to cause the processor to authenticate the user of the personal device by receiving a notification from a remote service of a pairing between the shared conferencing device and the personal device.

19. The non-transitory computer readable storage media of claim 15, further comprising instructions operable to cause the processor to initiate a virtual connection between the shared conferencing device and the personal device.

20. The non-transitory computer readable storage media of claim 19, further comprising instructions operable to cause the processor to disconnect the virtual connection upon a determination that the physical cable is disconnected from either the first port on the shared conferencing device or the second port on the personal device.

* * * * *

UNITED STATES PATENT AND TRADEMARK OFFICE
CERTIFICATE OF CORRECTION

PATENT NO. : 11,095,659 B2
APPLICATION NO. : 15/992379
DATED : August 17, 2021
INVENTOR(S) : Jochen C. Schirdewahn et al.

Page 1 of 1

It is certified that error appears in the above-identified patent and that said Letters Patent is hereby corrected as shown below:

In the Claims

Claim 15, Column 12, Line 40, please replace "on the first computing shared" with --on the shared--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*